Patented Jan. 28, 1947

2,414,838

UNITED STATES PATENT OFFICE 2,414,838

PROCESS FOR THE MANUFACTURE OF GLYCERIN

Arthur L. Schade, New York, N. Y., and Eduard Färber, New Haven, Conn., assignors to The Overly Bio-Chemical Research Foundation, Inc., New York, N. Y., a corporation of New York No Drawing. Application July 15, 1943, Serial No. 494,853

11 Claims. (Cl. 195—38)

The present invention relates to the manufacture of glycerin by the fermentation of carbohydrate substances with the aid of yeast and in the presence of magnesium carbonate.

It is the general object of the invention to provide an improved fermentation process for the manufacture of glycerin with the aid of magnesium carbonate wherein the fermentation time is reduced, the yield of glycerin increased, and the yeast rendered recoverable in a form in which it is in condition for re-use in the same process.

Briefly described, the present invention resides in the feature that the controlling action of the magnesium carbonate upon the course of the fermentation is effected and regulated by removing, in any suitable way and during the course of the fermentation, at least part of those reaction products which are more volatile than water, as explained hereinafter.

In carrying out one form of our improved process, a neutral gas is bubbled through the fermenting solution, whereby the solution is agitated and a more efficient abstraction of the volatile components, including carbon dioxide, is insured. As the action of the gas is primarily or entirely the mechanical one of carrying off volatile vapors, any fixed, neutral gas which will not interfere with the fermentation and is non-poisonous can be used. Thus, nitrogen, oxygen and air may be employed, the last-named being preferred for obvious reasons. The gas is then subjected to a treatment whereby the vapors are recovered for further use. The gas may be passed through one or more scrubbing towers or subjected to any other suitable treatment for the recovery of the abstracted vapors, which consist for the most part of alcohol and aldehyde; and if it is re-circulated through the fermenting mash, it is also scrubbed of its $CO_2$, both to limit the amount of magnesium carbonate that is dissolved by conversion to bicarbonate and to prevent the pH of the mash from falling below 7, the pH value being kept between 7 and 8 to secure maximum yield of glycerin in a minimum of time.

The production of glycerin by fermentation of carbohydrates with yeast in the presence of magnesium carbonate is itself known. The magnesium carbonate acts as a steering agent which causes the fermentation to deviate from the normal course, in which alcohol is the main product, to a more complex reaction in which a considerable part of the carbohydrate is converted into glycerin. We have found that by continuously removing to a considerable extent the more volatile products, that is, the substances which are more volatile than water, during the course of fermentation as by passing a stream of gas through the fermenting mash in the presence of the magnesium carbonate, and by controlling the pH value of the mash, the fermentation proceeds much more rapidly and gives appreciably higher yields of glycerin.

Preferably the pH during the fermentation is maintained, as already mentioned, at a value of 7 to 8. The amount of magnesium carbonate necessary for this purpose is between 10 and 20 parts for every 100 parts of the fermentable carbohydrate which is present at the beginning of the fermentation.

Where a gas is employed to expel the more volatile products, the stream of gas can be regulated so that about 1 liter per minute is passed through 10 liters of the solution to be fermented. If air is used as the gas, the yeast grows somewhat during the fermentation. In any case, whatever gas is used in the process the yeast is maintained in a healthy state so that it is capable of being utilized again to ferment fresh amounts of carbohydrates according to the present method.

The volatilized materials entrained with the stream of gas can be recovered by passing the gas through scrubbers in which the gas is washed with liquids which absorb the volatilized organic materials like alcohol and acetaldehyde. It is also possible to use adsorbent solid materials like adsorbent carbon, for the recovery of these products.

The fermentation under these conditions, when done in batches, is completed in about 1 day at the temperatures usual for such fermentations, namely, between 30–34° C. Preferably, in addition to the stream of gas, mechanical stirring is used in order to assure favorable contact between the insoluble magnesium carbonate, the yeast, and the solution.

After the fermentation is completed, the insoluble magnesium carbonate and the yeast are easily recovered by filtration. The filter cake containing the magnesium carbonate and the yeast can be utilized directly to ferment new amounts of carbohydrates, a quantity of carbonate being added to make up for losses. Some magnesium is found in the solution and can be precipitated from it in the form of an insoluble magnesium compound, for instance, as carbonate or sulfite. In this way, none of the originally introduced magnesium carbonate is lost and at the same time, the solution is freed from dissolved magnesium ions. The carbohydrate for this purpose can be provided from any of the commercial sources, either sucrose or hydrolyzed starch obtained, for instance, from farm products in known manner.

*Example 1*

A regular solution is prepared by hydrolyzing wheat according to one of the customary methods. The solution then contains 17% of total reducing sugar. 10 liters of the solution corresponding to 1700 grams of reducing sugars and 170 grams of a pressed yeast containing approximately 72% water, are placed in a fermenting vat equipped with stirrer, gas disperser, and gas outlets, in a constant temperature room of approximately 32° C. Air is passed into this mixture at a rate of approximately 1 liter per minute. The gas outlet is connected with one or more scrubbing towers in which first water and then sodium sulfite is used for washing out alcohol and aldehyde from the gas. The pH during the fermentation is 7 to 7.2, maintained by the addition of 170 grams of $MgCO_3$.

After 26 hours substantially all of the fermentable sugar (1300 grams) has been used up. Filtration yields a filter cake in which approximately 400 grams of yeast on the basis of about 72% water in the yeast are present. Approximately 10% of the fermentable sugars has been utilized for the production of the additional amount of yeast. The filtrate, after concentrating, gives a distillate containing about 310 grams of pure glycerin which amounts to approximately 26% of the sugar used for the fermentation.

*Example 2*

In a procedure corresponding to that of Example 1, nitrogen was used as the gas with the following results: While the growth of yeast was somewhat less, the yield in glycerin corresponded to 18 grams per 100 grams of sugar subjected to fermentation. After subjecting the nitrogen to scrubbing in order to remove the vapors (or after passing it through a cold condenser to condense the vapors) it is either bubbled through a solution of calcium hydroxide or passed through a scrubbing tower where it meets a spray of calcium hydroxide solution, to remove carbon dioxide and is then re-circulated through the fermenting mash.

The more volatile reaction products of the fermentation may be removed from the fermenting mash in other ways than by being entrained in a current of gas. For example, the fermenting mash may be circulated through a tower into which it is sprayed, whereby the lower alcohols, aldehydes, etc. are vaporized and after being withdrawn from the tower, the vapors may be delivered to a condenser; instead of being passed through a sprayer, the fermenting mash may be passed in thin streams or films over extended flat surfaces, which will encourage vaporization and expulsion of volatile reaction products, including carbon dioxide. The escape of the vapors can be aided by vacuum, which may at least in part be produced by the condensation of the vapors in the condenser which is connected with the vaporizing chamber.

We claim:

1. In a process for the manufacture of glycerin by fermentation of carbohydrates with yeast in the presence of magnesium carbonate, the steps which comprise expelling at least part of the more volatile products of the fermentation as they are formed and approximately at the fermentation temperature, and thereafter recovering glycerin from the fermentation liquor.

2. In a process for the manufacture of glycerin by fermentation of carbohydrates with yeast in the presence of magnesium carbonate, the steps which comprise passing a stream of a gas through the fermenting mash to carry off at least part of the more volatile products of the fermentation during the course of fermentation, and thereafter recovering the insoluble matter and the glycerin from the fermentation liquor.

3. Process according to claim 1, wherein about 10 to 20 parts of magnesium carbonate are used for each 100 parts of initial fermentable carbohydrate material.

4. Process according to claim 1, wherein the more volatile products are expelled by subjecting the mash, during the fermentation, to conditions favorable to evaporation.

5. Process according to claim 2, wherein the gas is air.

6. Process according to claim 2, wherein the gas is nitrogen.

7. Process for the manufacture of glycerin by fermentation of carbohydrate material in the presence of magnesium carbonate, which comprises passing a stream of a gas through the fermenting mash during the fermentation to expel volatile substances, and removing the abstracted vapors from such gas.

8. Process according to claim 7, wherein the vapor-free gas is re-circulated through the fermenting mash, after removal of carbon dioxide from such gas.

9. Process for the manufacture of glycerin which comprises subjecting a hydrolyzed wheat solution to the action of yeast in the presence of magnesium carbonate, bubbling air through the fermenting mash during the course of fermentation, scrubbing the vapor-laden gas first with water and then with water containing a soluble sulfite, removing insoluble matter from the fermentation liquor and recovering the glycerin from the liquid.

10. In a process for the manufacture of glycerin by fermentation of carbohydrates with yeast in the presence of magnesium carbonate, the steps which comprise expelling at least part of the more volatile products of the fermentation as they are formed while maintaining the magnesium carbonate during the fermentation in excess of the quantity required for neutralization of the liquor, and thereafter recovering glycerin from the fermentation liquor.

11. Process according to claim 10, wherein the expulsion of the more volatile components is effected by mechanically agitating the fermenting mash and bubbling a neutral gas therethrough.

ARTHUR L. SCHADE.
EDUARD FÄRBER.